(12) United States Patent
Dhani Reddy

(10) Patent No.: US 11,108,773 B1
(45) Date of Patent: Aug. 31, 2021

(54) MOBILE USER AUTHENTICATION OVER WIFI USING IPX NETWORKS

(71) Applicant: Facebook, Inc., Menlo Park, CA (US)

(72) Inventor: Govardhan Reddy Dhani Reddy, Dublin (IE)

(73) Assignee: Facebook, Inc., Menlo Park, CA (US)

( * ) Notice: Subject to any disclaimer, the term of this patent is extended or adjusted under 35 U.S.C. 154(b) by 138 days.

(21) Appl. No.: 16/518,368

(22) Filed: Jul. 22, 2019

Related U.S. Application Data

(60) Provisional application No. 62/819,249, filed on Mar. 15, 2019.

(51) Int. Cl.
G06F 21/00 (2013.01)
H04L 29/06 (2006.01)
H04L 9/32 (2006.01)

(52) U.S. Cl.
CPC ............ *H04L 63/0876* (2013.01); *H04L 9/32* (2013.01); *H04L 63/0272* (2013.01); *H04L 63/126* (2013.01)

(58) Field of Classification Search
CPC ............... H04L 63/0876; H04L 9/3247; H04L 63/0272; H04L 63/126; H04L 9/32
See application file for complete search history.

(56) References Cited

U.S. PATENT DOCUMENTS

| | | | |
|---|---|---|---|
| 8,543,814 B2* | 9/2013 | Laitinen | H04L 9/3263 713/167 |
| 8,931,060 B2* | 1/2015 | Bidare | H04L 9/3247 726/4 |
| 2005/0262343 A1* | 11/2005 | Jorgensen | H04L 63/10 713/168 |
| 2008/0155657 A1* | 6/2008 | Ogura | H04L 63/08 726/3 |
| 2012/0149336 A1* | 6/2012 | Schroder | H04W 12/084 455/411 |
| 2016/0269899 A1* | 9/2016 | Carames | H04W 8/02 |
| 2019/0305955 A1* | 10/2019 | Verma | H04L 63/18 |

* cited by examiner

*Primary Examiner* — Ghazal B Shehni
(74) *Attorney, Agent, or Firm* — Fenwick & West LLP

(57) ABSTRACT

A client device accesses an online system using an authentication process when it is connected to a public network and not a private network. The client device requests access using an authentication broker via the public network. The authentication broker determines an authentication system and transmits identification information for the client device to the authentication system via the private network. The authentication broker receives an authentication vector generated by the authentication system via the private network, and receives a verification response from the client device via the public network. The verification response corresponds to a verification challenge generated based on the authentication vector by the authentication broker. The authentication broker determines the client device is authorized to access the online system based on the authentication vector and verification response and transmits an authorization to the client device via the public network allowing access to the online system.

20 Claims, 7 Drawing Sheets

MOBILE USER AUTHENTICATION OVER WIFI USING IPX NETWORKS

CROSS REFERENCE TO RELATED APPLICATIONS

This application claims the benefit of U.S. Provisional Application No. 62/819,249, filed Mar. 15, 2019, which is incorporated by reference in its entirety.

FIELD OF INVENTION

This disclosure relates generally to authentication processes and methods, and, more specifically, to a mobile user authentication over WIFI using IPX networks.

BACKGROUND

While a traditional user authentication process ("authentication") provides many advantages, it may also have several drawbacks. For example, traditional authentication requires access to two separate networks to authenticate a client device when accessing an online system (e.g., two-factor authentication). However, in some circumstances, the client device is only able to access a single network rather than two separate networks. In these situations, traditional authentication fails and a user may not be able to access data on the online system. Accordingly, an authentication process that allows a user to authenticate a client device when they are connected to a single network (rather than two networks) would be beneficial.

SUMMARY

Described herein is a system environment configured to enable an authentication method in situations where a client device only has access to a public network. To provide context, the environment includes a client device connected to both an online system and an authentication broker via the public network (e.g., the internet). The online system uses the authentication method for the client device to access information. Because the client device is unable to access an authentication system (e.g., a mobile network operator) via a second network (e.g., a cellular network), the online system authenticates the client system using an authentication broker. The authentication broker is connected to the authentication system via a second network employing a communication protocol (e.g., a cellular network employing an internetwork packet exchange protocol) which enables the authentication broker to perform authentication method.

To do so, the client device requests an authentication for the client device to access the online system and transmits identification information for the client device (e.g., international mobile subscriber identity) to the authentication broker via the public network. The authentication broker determines an authentication system to authenticate the client device and transmits the authentication request and identification information to the authentication system via the private network. The authentication system generates an authentication vector for the client device and transmits the authentication vector to the authentication broker via the private network. The authentication broker generates a verification challenge corresponding to the authentication vector and transmits the verification challenge to the client device via the public network. The client device generates a verification response to the verification challenge and transmits the verification response to the authentication broker via the public network. The authentication broker determines if the authentication vector and verification response include information indicating that the client device is authorized to access the online system. If the client device is authorized to access the online system, the authentication broker transmits an authorization to the client device allowing the client device to access information on the online system via the public network.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Overview

Figure 1A:
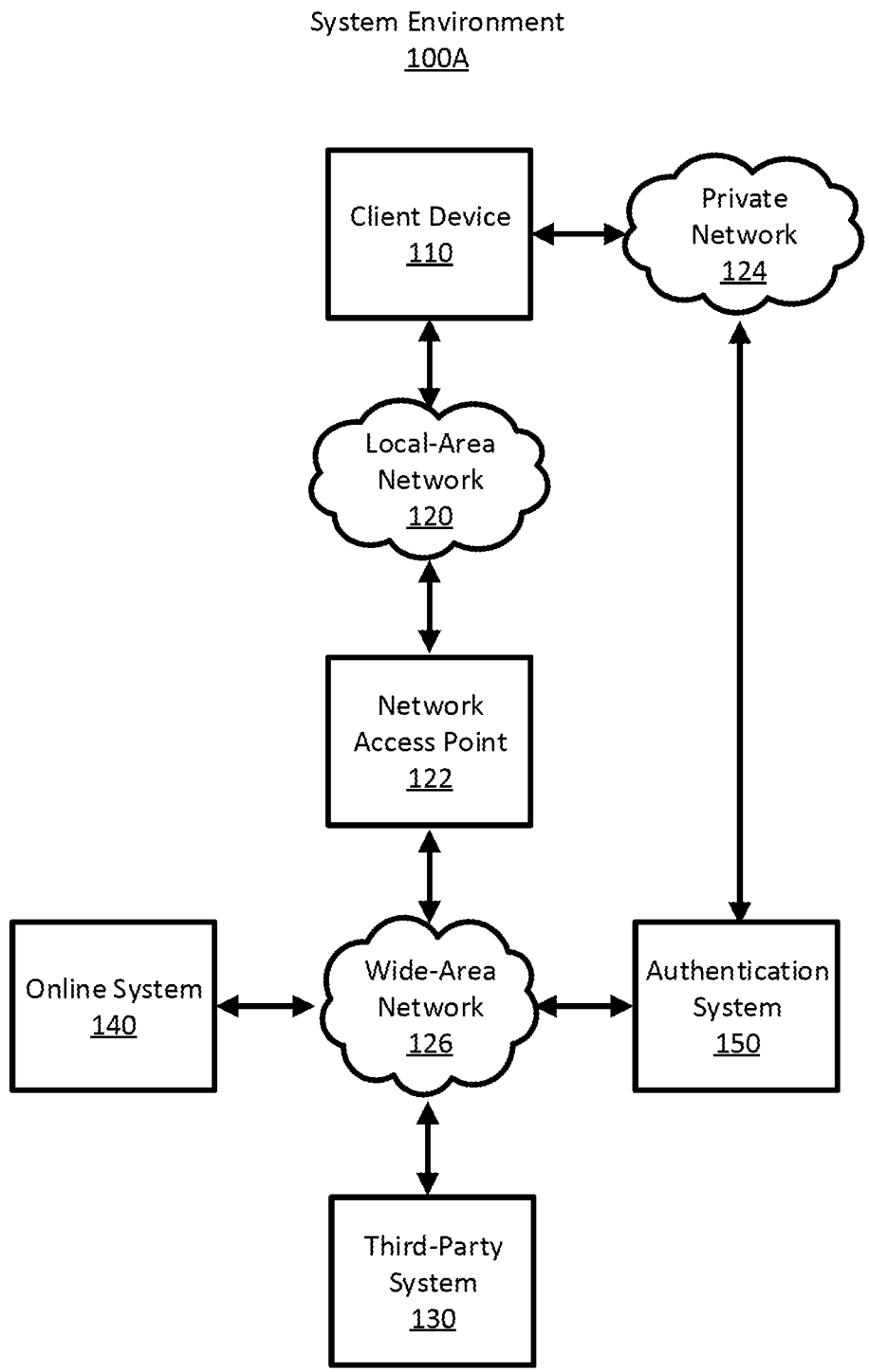
FIG. 1A is a block diagram of a system environment for an online system configured for traditional authentication, according to one or more embodiments.

Many traditional authentication processes use two different networks connected to a single device to authenticate the device. In many traditional authentication processes, a first network (e.g., the internet) is employed to authenticate a client device using a password, and a second network (e.g., a cellular network) is employed to authenticate the client device using an authentication system (e.g., a short message service ("SMS") authentication token system). To provide additional context, FIG. 1A is a block diagram of a system environment 100A for an online system 140 configured for traditional authentication, according to one or more embodiments. For example, FIG. 1A illustrates a system environment 100A configured to implement a two-factor authentication process.

The system environment 100A shown by FIG. 1A comprises at least one client device 110, a local-area network 120, one or more network access point 122, one or more private network 124, a wide-area network 126, one or more third-party system 130, the online system 140, and at least one authentication system 150. In alternative configurations, different and/or additional components may be included in the system environment 100A. For example, the online system 140 is a social networking system, a content sharing network, or another system providing content to users. As another example, the local-area network 120 is a local wireless network (e.g., a Wi-Fi), the private network 124 is a cellular network, and the wide-area network is the internet, but other network configurations are also possible. Description of the functionality of the various networks, access points, and systems illustrated in FIG. 1A are provided below in regard to FIG. 1B.

In the system environment 100A, the client device 110 may access the online system 140 after accomplishing a traditional authentication (e.g., a two-factor authentication process). The traditional authentication may leverage both the private network 124 and wide-area network 126 to authenticate the client device 110. To illustrate, the online system 140 includes a user profile corresponding to a user of the client device 110. The user profile may additionally include identifying information of the client device 110 and/or user information to enable authentication (e.g., an email address, a phone number, etc.). The user of the client device 110 utilizes a user interface of the client device 110 to request access to their user profile on the online system. When requesting access, the user may provide a password (or some other verification) for the user profile to the online system 140. The client device 110 transmits the access request (including the password) to the network access point 122 via the local-area network 120. The network access point 122 relays the access request to the online system 140 via the wide-area network 126. However, because the online system 140 requires two-factor authentication the client device 110 is unable to access the user profile.

To continue the traditional authentication, the online system 140 requests a secondary verification of the client device 110 via an authentication system 150. In an example, the authentication system 150 is a mobile network operator. Some examples of mobile network operators in the U.S.A. are Xfinity, T-Mobile, and AT&T. In this case, the online system 140 generates an authentication token as the secondary verification and provides the authentication token to the mobile network operator. The mobile network operator provides the authentication token to the client device 110 via the private network 124 (e.g., in an SMS message). The user of the client device 110 provides the authentication token to the online system 140 via the network access point 122 using the wide-area network 126 and local-area network 120, respectively. If the received authentication token matches the generated access token, the online system 140 verifies that the client device 110 is authorized to access the user profile. Once verified, the user can access the functionality and information associated with the user profile on the online system 140.

In some circumstances, traditional (e.g., two-factor) authentication is untenable. For example, a client device only 100 may only have access to a single network (e.g., a local area-network 120) while simultaneously operating in an area where a second network (e.g., a private network) is unavailable. In these situations, traditional two-factor authentication is not implementable. Described below is a system configured to allow a client-device to accomplish multi-factor authentication when the client device is only able to access a single network rather than two networks.

System Architecture

Figure 1B:
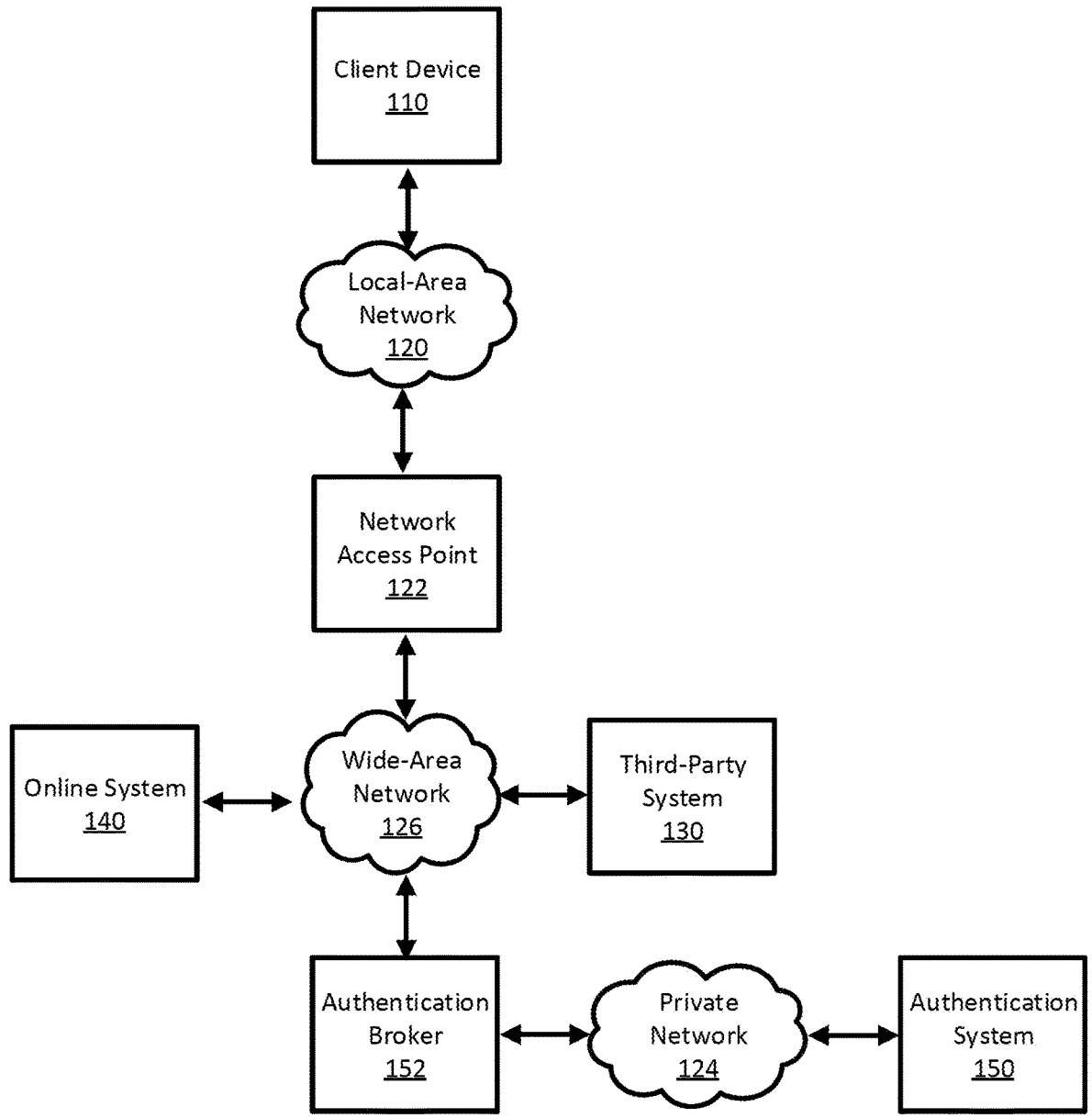
FIG. 1B is a block diagram of a system environment for an online system configured for an authentication method using only a local-area network, according to one or more embodiments.

FIG. 1B is a block diagram of a system environment 100B for an online system 140 configured for an authentication process using only a local-area network 120, according to one or more embodiments. The system environment 100B shown in FIG. 1B comprises at least one client device 110, a local-area network 120, at least one network access point 122, one or more private network 124, a wide-area network 126, at least one third-party system 130, the online system 140, at least one authentication system 150, and at least one authentication broker 152. In alternative configurations, different and/or additional components may be included in the system environment 100B. For example, like FIG. 1A, the online system 140 is a social networking system, a content sharing network, or another system providing content to users. Further, the local-area network 120 is a local wireless network (e.g., a Wi-Fi), the private network 124 is a cellular network, and the wide-area network 126 is the internet, but other network configurations are also possible.

Within the system environment 100B, and as described in more detail herein, the online system 140 utilizes the client device 110 the authentication broker 152, and authentication system 150 to execute the authentication process for the client device 110. Notably, the authentication process is dissimilar to the traditional authentication process described regarding FIG. 1A. More particularly, the authentication process allows the client device to perform an authentication process in situations where the client device does not have access to more than one network. As an example, the authentication process occurs when the client device 110 is unable to connect to the authentication system 150 via the private network 124, but can access the online system 140 via a public network. (i.e., local-area network 120 and wide-area network 126). In this example, the client device 110 may be a cellular phone unable to access a cellular network while able to access the internet via a local Wi-Fi network.

The client devices 110 are one or more computing devices configured to receive user input as well as transmitting and/or receiving data via network connections. In one embodiment, a client device 110 is a conventional computer system, such as a desktop or a laptop computer, but may also be any other device having computer functionality, such as a personal digital assistant (PDA), a mobile telephone, a smartphone, or another suitable device. In one embodiment, a client device 110 executes an application allowing a user of the client device 110 to interact with and/or access functionality of the online system 140. For example, a client device 110 executes a browser application to enable interaction between the client device 110 and the online system 140 via the local-area network 120 and wide-area network 126. In another embodiment, a client device 110 interacts with the online system 140 through an application programming interface (API) running on a native operating system of the client device 110, such as IOS® or ANDROID™.

The client device 110 is configured to communicate via one or more of the networks illustrated in the system environment 110B, which may comprise any combination of networks using both wired and/or wireless communication systems. As illustrated, the client device 110 is configured to communicate with the wide-area network 126 via the local-area network 120 using the network access point 122. The client device 110 is also configured to communicate with the authentication system 150 via the private network 124. However, in the system environment 100B, the private network 124 is unavailable in the location of the client device 110, or the client device 110 is unable to connect to the private network 124. As such, the traditional authentication described above in regard to the system environment 100A of FIG. 1A is not employable in the system environment 100B of FIG. 1B.

The client device 110 is identifiable by a variety of identification information. The identification information may be any information that may be employed to authenticate the client device 110 to access the online system as part of the authentication process. For example, the identification information may include a telephone number, an email address, an international mobile subscriber identity ("IMISI"), a mobile station international subscriber directory number ("MSISDN"), etc. Further, the identification information may be any identification information stored on the subscriber information module (i.e., SIM card) of the client device. The identification information may be stored on a datastore of the client device, read from hardware and/or software of the client device 110 (e.g., a hardware profile), and or input into the client device a user and/or administrator (e.g., a password). The identification information may be associated with a user profile for the user on the online system and/or authentication system such that the online system and/or authentication system may employ the identification information as part of a multi-factor identification process.

The client device 110 is configured to generate and transmit an authentication request to an online system 140 via the local-area network 120. The authentication request initiates an authentication process within the system environment 100B. In an example, the authentication process provides the client device access to a system (e.g., the online system 140) when the client device 110 is authenticated by the authentication broker 152. The authentication request may include identification information that the authentication broker and/or online system 140 may employ to authenticate the client device 110.

In some examples, the client device 110 is configured to determine the connectivity of the client device 110 to the networks in the system environment 100B. For example, the client device 110 may determine connectivity to the private network 124 in the system environment 100B. Further, the client device 110 may determine connectivity to the local-area network 120 and/or the wide-area network 126 in the system environment 110B. As described in more detail below, the client device 110 may utilize different authentication processes depending on the determined connectivity of the client device 110 to networks in the system environment 110B.

The one or more network access points 122 are configured to relay information between the local-area network 120 and the wide-area network 126 (i.e., enabling the public network). As such, the network access point 122 may employ any number of communication and/or encryption protocols to translate information between the two networks. In an example, the network access point 122 is a wireless router configured to enable the client device 110 to relay information between the wide-area network 126 (e.g., the internet) and the local-area network 120 (e.g., a Wi-Fi network), but could be another network access point 122 relaying information between other networks. In an example, a network access point may be configured with 802.1x EAP-SIM or EAP-AKA authentication methods.

In one embodiment, one or more of the networks in the system environment 100B use standard communications technologies and/or protocols. For example, the networks may include communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the networks include multiprotocol label switching (MPLS), sequenced packet exchange (SPX), transmission control protocol/Internet protocol (TCP/IP), hypertext transport protocol (HTTP), simple mail transfer protocol (SMTP), and file transfer protocol (FTP). Data exchanged over the networks may be represented using any suitable format, such as hypertext markup language (HTML) or extensible markup language (XML). In a particular implementation of the system environment 100B, the private network 124 is a network employed by at least one mobile network operator employing an internetwork packet exchange (IPX) protocol, the local-area network 120 is a Wi-Fi network employing standard wireless communication protocols, and the wide-area network 126 is the internet and employs standard TCP/IP communication protocols. In some embodiments, all or some of the communication links of the networks may be encrypted using any suitable technique or techniques.

One or more third-party systems 130 may be coupled to the wide-area network 126 for communicating with the online system 140, which is further described below in conjunction with FIG. 2. In one embodiment, a third-party system 130 is an application provider communicating information describing applications for execution by a client device 110 or communicating data to client devices 110 for use by an application executing on the client device. In other embodiments, a third-party system 130 provides content or other information for presentation via a client device 110. A third-party system 130 may also communicate information to the online system 140, such as advertisements, content, or information about an application provided by the third-party system 130.

One or more authentication systems 150 may be coupled to the authentication broker 152 via the private network 124 (e.g., an IPX network). In an example, the authentication systems 150 are mobile network operators that are connected to an authentication broker 152 by a private IPX network. The private IPX network allows all mobile network operators to utilize a single private network such that they are interconnected with one another. The interconnectivity of the private IPX network allows a client device 110 to access multiple mobile network operators using an authentication broker 152 that is connected to the client device 110 via the wide-area network 126 and local area network 120. Further, the inter-connectivity enables the authentication process for client devices 110 only connected to a wide-area network 126 via a local-area network 120.

The authentication system 150 is configured to verify that the client device 110 is authorized to access its corresponding user profile on the online system 140 during the authentication process. In various examples, the authentication system 150 may be a mobile network operator, an email server, a key-access system, or some other authentication system 150. One example of a mobile network operator is a cellular phone operator, and the corresponding private network 124 is a mobile carrier network.

The authentication system 150 stores identification information for client devices. The authentication system 150 may use the identification information as part of the authentication process as described herein. For example, a user profile may be associated with identification information (e.g., an IMSI) for a client device 110 on the online system 140. In response to a client device 110 requesting access to the user profile, the online system 140 provides the identification information to the authentication system 150 and the authentication system 150 may act to authorize the requesting client device 110 using the received identification information. This process is described in more detail below in regard to FIGS. 3A and 3B.

One or more authentication brokers 152 (e.g., an authentication, authorization and accounting server) may be coupled to the wide-area network 126 for communicating with the client device 110 and online system 140. The authentication broker 152 assists the client device 110 and online system 140 in the authentication process. In an embodiment, the authentication broker 152 may determine an authentication system 150 of the one or more authentication system to complete the authentication process. To provide a contextual example, if the authentication system 150 is a mobile network operator, the authentication broker 152 may determine a particular mobile network operator of the one or mobile network operators to complete the authentication process. To illustrate, the authentication broker 152 may select a mobile network operator of the one or more mobile network operators previously associated with the client device 110 being authenticated. Selection of an authentication system of the one or more authentication systems is described in more detail below.

In an embodiment, the authentication broker 152 may determine a private network 124 of the one or more private networks to employ when completing the authentication process. For example, if the authentication broker 152 can access one or more private networks 124 and/or the private network 124 can communicate with one or more authentication system 150, the authentication broker 152 may determine the private network 124 and/or communication protocol to complete the authentication process. The selection of the private network 124 may be based on one or more characteristics of the private network. This process is described in more detail below in regard to FIGS. 3A and 3B.

Within the system environment 100B, the client device 110, the authentication broker 152, and the authentication system 150 act in conjunction to verify that the user of the client device 110 is authorized to access the user profile to which they request access on the online system 140. In an example, the authentication broker 152 can manage an authentication process between the online system 140 and the authentication system 150. To illustrate, the authentication broker 152 may receive a request from a client device 110 to access a user profile on the online system 140. The authentication broker 152 verifies that the user associated with the client device 110 requesting access to the user profile on the online system 140 is authorized to access the user profile by leveraging the identification information of the client device 110. The authentication broker 152 transmits an authentication request to the authentication system 150 including the identifying information for the client device 110 (e.g., the IMSI). The authentication system 150 generates an authentication vector corresponding to the identification information of the client device 110 and transmits the authentication vector to the authentication broker 152. The authentication broker 152 generates a verification challenge for the client device 110 corresponding to the authentication vector and transmits the verification challenge to the client device 110. The client device 110 generates a verification response corresponding to the verification challenge and transmits the verification response to the authentication broker 152. Based on information in the verification response and the authentication vector, the authentication broker 152 determines that the client device 110 is (or is not) authorized to access the user profile. If the client device 110 is authorized, the authentication broker 152 may access identification information from the authentication system 150 to provide to the online system 140 to complete the authentication process. This process is described in more detail below in regard to FIGS. 3A and 3B.

Figure 2:
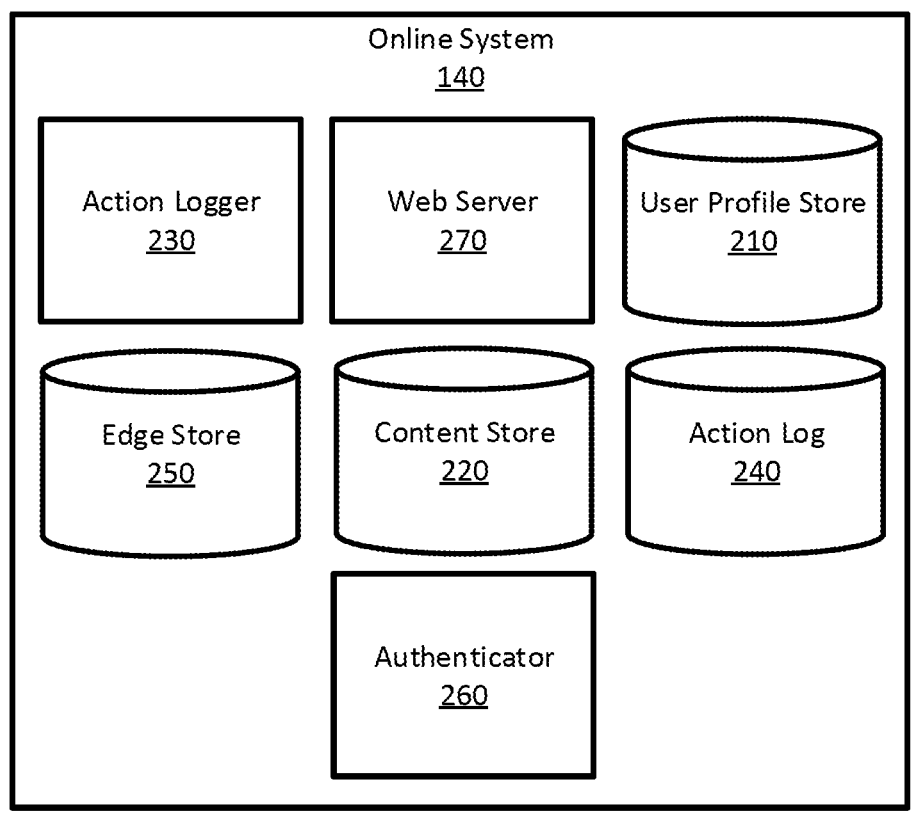
FIG. 2 is a block diagram of an online system, according to one or more embodiments.

FIG. 2 is a block diagram of an architecture of the online system 140, according to one or more embodiments. The online system 140 shown in FIG. 2 includes a user profile store 210, a content store 220, an action logger 230, an action log 240, an edge store 250, an authenticator 260, and a web server 270. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 210. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 210 may also maintain references to actions by the corresponding user performed on content items in the content store 220 and stored in the action log 240.

Further, a user profile may store information that may assist in authenticating a client device 110 using the authentication process. For example, a user profile store may include identification information for a client device 110. The identification information may include any information that the user has previously associated with their user profile. For example, the user profile may store a telephone number, a message authentication code (MAC), an IMSI, a MSISDN, an email address, etc. More generally, the user profile may store any information associated with a SIM card of a client device 110. The profile may also include various preferences for the authentication process. For example, the user profile may store an association between the user and a private network 124, authentication system 150 (e.g., mobile network operator), phone number, email address, etc. The association(s) may be generated by the user to indicate preferred systems to utilize during the authentication process. The profile may also store various encryption keys used for communicating information within the system environment 100B. For example, the profile may store an access key for an authentication system 150.

While user profiles in the user profile store 210 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 220 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 220, such as status updates, photos tagged by users to be associated with other objects in the online system 140, events, groups or applications. In some embodiments, objects are received from third-party applications or third-party applications separate from the online system 140. In one embodiment, objects in the content store 220 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

The action logger 230 receives communications about user actions internal to and/or external to the online system 140, populating the action log 240 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 240.

The action log 240 may be used by the online system 140 to track user actions on the online system 140, as well as actions on third-party systems 130 that communicate information to the online system 140. Users may interact with various objects on the online system 140, and information describing these interactions is stored in the action log 240. Examples of interactions with objects include: commenting on posts, sharing links, checking-in to physical locations via a client device 110, accessing content items, and any other suitable interactions. Additional examples of interactions with objects on the online system 140 that are included in the action log 240 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 240 may record a user's interactions with advertisements on the online system 140 as well as with other applications operating on the online system 140. In some embodiments, data from the action log 240 is used to infer interests or preferences of a user, augmenting the interests included in the user's user profile and allowing a more complete understanding of user preferences.

The action log 240 may also store user actions taken on a third-party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 240 may record information about actions users perform on a third-party system 130, including webpage viewing histories, advertisements that were engaged, purchases made, and other patterns from shopping and buying. Additionally, actions a user performs via an application associated with a third-party system 130 and executing on a client device 110 may be communicated to the action logger 230 by the application for recordation and association with the user in the action log 240.

In one embodiment, the edge store 250 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140. Edges may connect two users who are connections in a social network, or may connect a user with an object in the system. In one embodiment, the nodes and edges form a complex social network of connections indicating how users are related or connected to each other (e.g., one user accepted a friend request from another user to become connections in the social network) and how a user is connected to an object due to the user interacting with the object in some manner (e.g., "liking" a page object, joining an event object or a group object, etc.). Objects can also be connected to each other based on the objects being related or having some interaction between them.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 250 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 250, in one embodiment. Alternatively, each interaction between a user and a specific object is stored as a separate edge. In some embodiments, connections between users may be stored in the user profile store 210, or the user profile store 210 may access the edge store 250 to determine connections between users.

The authenticator 260 performs tasks on the online system 140 associated with authorizing a user of a client device 110 to access a user profile associated with the user. For example, the authenticator 260 may receive a password from a client device 110 attempting to access a user profile associated with the user of the client device 110. In response, the online system 140 may initiate a secondary authentication process to ensure that the requesting client device is authorized to access the user profile. For example, the online system 140 may initiate an authentication process to ensure the client device is being operated by the user associated with the user profile before allowing the client device to access the requested user profile.

The web server 270 links the online system 140 via the networks to the one or more client devices 110, as well as to the one or more third-party systems 130. The web server 270 serves web pages, as well as other content, such as JAVA®, FLASH®, XML and so forth. The web server 270 may receive and route messages between the online system 140 and the client device 110, for example, instant messages, queued messages (e.g., email), text messages, short message service (SMS) messages, or messages sent using any other suitable messaging technique. A user may send a request to the web server 270 to upload information (e.g., images or videos) that are stored in the content store 220. Additionally, the web server 270 may provide application programming interface (API) functionality to send data directly to native client device operating systems, such as IOS®, ANDROID™, or BlackberryOS.

Authentication Using a Local Network

Figure 3A:
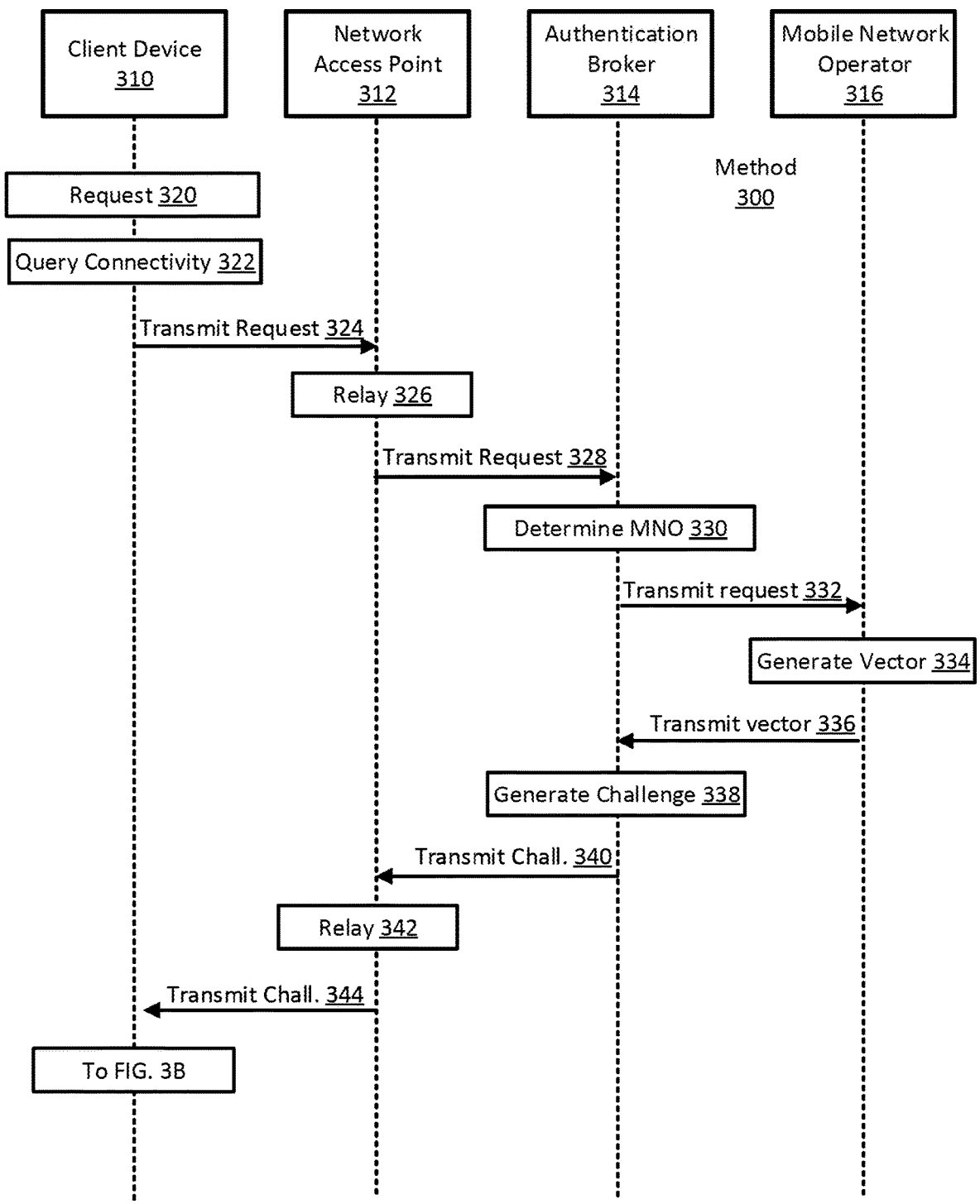
FIG. 3A is an interaction diagram for a multi-factor identification method in which a client device may only access a local-area network, according to one or more embodiments.
Figure 3B:
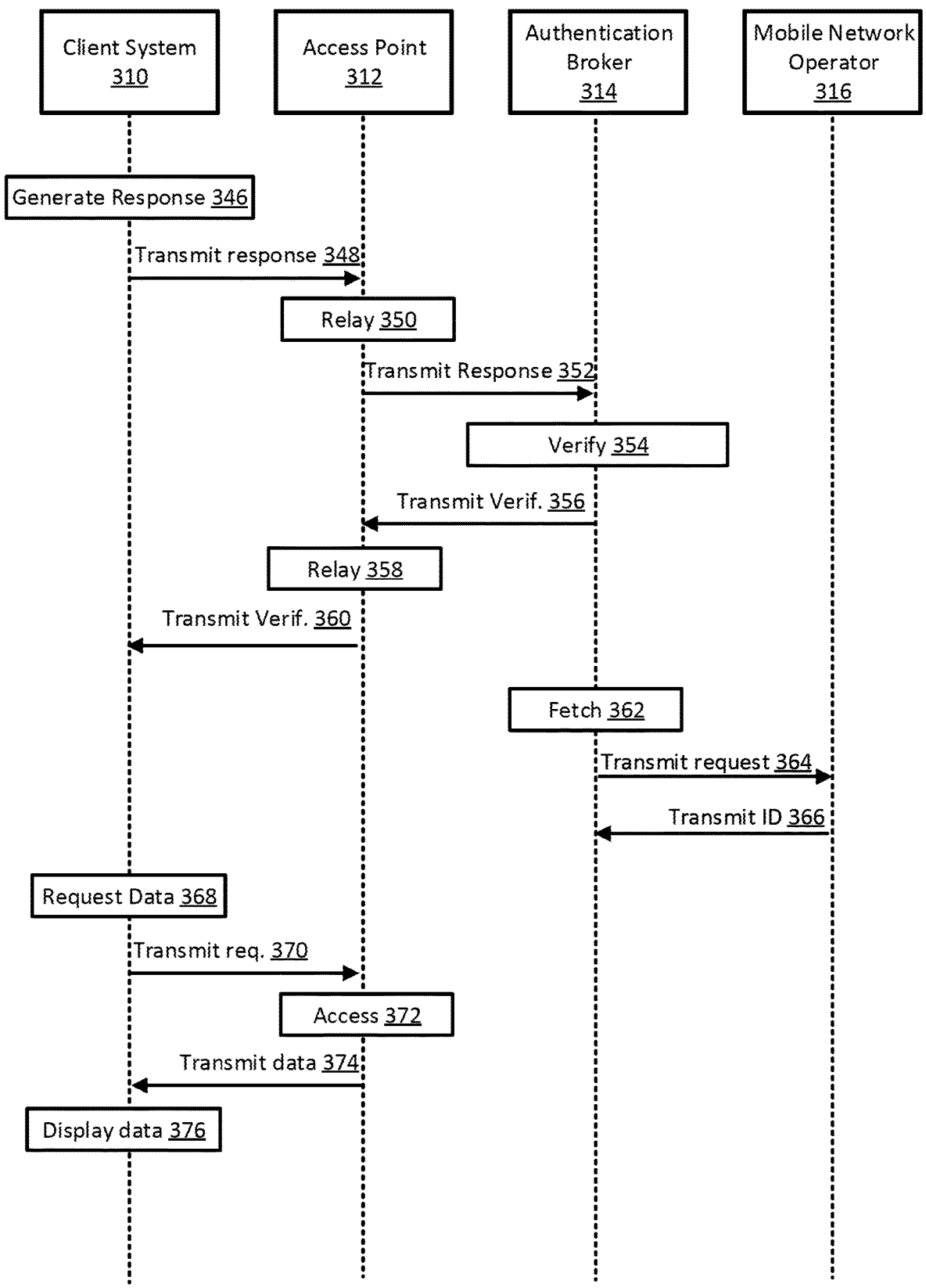
FIG. 3B is a continuation of the interaction diagram of FIG. 3A illustrating a multi-factor identification method in which a client device may only access a local-area network, according to one or more embodiments.

FIGS. 3A and 3B are interaction diagrams illustrating an authentication process (e.g., authentication method 300) for a client device 310 only having access to a local-area network, according to one or more embodiments. In the illustrated example the client device 310, the network access point 312, the authentication broker 314, and the mobile network operator 316 (i.e., authentication system 150), are like those described in regard to FIG. 1B and FIG. 2.

In the interaction diagrams, a user of the client device 310 requests an authentication for the client device 310. For example, the user of the client device 310 may attempt to access their corresponding user profile on an online system (e.g., the online system 140) and employs the authentication method 300 to authenticate the client device 310. In this example, authorizing the client device 310 allows access to the user profile on the online system and provides the user access to the information and functionality of the online system. Here, the user has previously associated identification information of the client device 310 with their user profile on the online system. As such, the client device 310 corresponds to the user profile such that identifying information of the client device 310 may be used as part of the authentication method 300 illustrated in FIGS. 3A and 3B. For example, the user profile may store a MAC for the client device 310 and the online system may use the MAC as part of the authentication method 300.

In this example, the online system employs the authentication method 300 for the user of the client device 310 to access their corresponding user profile on the online system. As a first-stage authentication, the online system receives a login credential (e.g., a password, a security verification, etc.) corresponding to the user profile from the client device 310. In an example, the client device 310 transmits the password to the online system using the network access point 312 via a wide-area network (e.g., the internet) and a local-area network (e.g., a Wi-Fi network, a local-area wireless network, etc.), respectively. As a second-second authentication the online system generates an authentication token, provides the authentication token to the client device 310, and receives a validation of the authentication token from the client device 310. As described above, in traditional authentication, the second-stage authentication utilizes both a wide-area network and a private network (e.g., a cellphone network). However, here, the client device 310 is unable to access the private network and, accordingly, employs the illustrated authentication method 300.

In the authentication method 300, the user of the client device 310 requests 320 an authentication for their client device 310 to access the online system. In the example of FIGS. 3A and 3B, the authentication request described in a process where a user requests access to their corresponding user profile on the online system using the client device 310, but could be other authentication requests for the client device 310 to access the online system. Here, the user requests access to the user profile by providing a login credential and requesting access to the user profile using the logic credential. Here, the user is executing an application on the client device 310 provided by the online system, and requesting access to the user profile may include, for example, entering the login credential via a user interface of the client device 310, accessing the login credential from a memory of the client device 310, etc.

The client device 310 queries 322 the connectivity of the client device 310 to various networks. For example, the client device 310 determines connectivity to a local-area network (e.g., local-area network 120), a private network (e.g., private network 124), a wide-area network (e.g., wide-area network 126), or another network. In this example, the client device 310 determines it is unable to connect to the private network but can connect to the local-area network, and continues with the authentication method 300. If the client device 310 determines it can connect to both the local-area network and the private network, the client device 310 proceeds with traditional authentication (e.g., similar to the environment described in FIG. 1A).

The client device 310 transmits 324 an authorization request to an authentication broker 314. The authorization request includes (i) the login credential, and (ii) identifying information of the client device 310. The identifying information may be any information that the online system and/or the mobile network operator 316 may use to authenticate the client device 310. For example, the identifying information includes an IMSI number and a MAC for the client device, but could include other identification information as described herein.

In an embodiment, the client device 310 transmits 324 the authorization request to a network access point 312 (e.g., a wireless internet router) for the local-area network. After receiving the authorization request, the network access point 312 relays 326 the authorization request and transmits 328 the request to an authentication broker 314. Additionally, in some configurations, the authentication broker 314 may request additional information from the client device 310 in response to receiving the authorization request. For example, the authentication broker 314 may request a verification that user wishes to proceed with the authorization process. As another example, the authentication broker 314 may request additional identifying information for the client device 310.

The authentication broker 314 determines 330 a mobile network operator ("MNO") 316 to authorize the client device 310 ("selected mobile network operator"). To illustrate, three examples of determining a selected mobile provider are provided. First, the authentication broker 314 determines the selected mobile network operator 316 is the mobile network operator indicated by the identification information included in and accessed from the authorization request. That is, the identification information may include an identifier for the client device 310 (e.g., an IMSI, telephone number, etc.) associated with a mobile network code ("MNC"). The MNC may be associated with a particular mobile network operator 316 of a number of mobile network operators and the authentication broker 314 selects the particular mobile network operator 316 as the selected mobile network operator 316 to authorize the client device 310. Second, the identifying information may include an identifier (e.g., an IMSI, telephone number, etc.) associated with a user profile on the online system, and the user profile indicates a preferred mobile network operator 316 of the number of mobile network operators to employ in authentication processes (e.g., authentication method 300). In this case, the authentication broker 314 selects the preferred mobile network operator 316 as the selected mobile network operator 316 to authorize the client device 310. Third, the authentication broker 314 queries the connectivity of each mobile network operator of a number of mobile network operators to the client device 310. The authentication broker 314 selects the mobile network operator having a connection to the client device as the selected mobile network operator 316 to authorize the client device 310. In some examples, at least two mobile network operators may have a connection to the client device 310. In these examples, the authentication broker 314 may determine the selected mobile network operator 316 based on a selection criterion (e.g., strongest connection, communication protocol type, etc.). Other examples of determining a selected mobile network operator 316 to authorize the client device 310 are also possible.

The authentication broker 314 transmits 332 the authorization request to the selected mobile network operator 316 via a private network. Here, a private network is employed by many mobile network operators. This allows numerous mobile network operators to handle information from client devices operating in areas where their preferred mobile network operator not provide service (i.e., a roaming network). In some examples, the private network is a network that employs an internetwork packet exchange (IPX) protocol, but could be another type of network and employ other types of protocols.

In some configurations, the authentication broker 314 can access more than one private network configured to transmit the authorization request to the selected mobile network operator 316 (e.g., if there are several roaming networks). Accordingly, the authentication broker 314 can determine a private network to transmit the authentication request ("selected private network") to the selected mobile network operator 316. Once determined, the authentication broker 314 transmits 332 the authorization request to the selected mobile network operator 316 using the selected private network. The authentication broker 314 may determine 332 which private network to employ based on one or more characteristics of the private networks. For example, each private network may have a cost associated with transmitting the authorization request to the selected mobile network operator 316. Here cost may be a financial cost, a bandwidth cost, or a temporal cost, of accessing a network and/or transmitting an authorization request. For example, the cost may be the financial cost to access an IPX network and use an authentication API. In this case, the authentication broker 314 may transmit the authorization request to the selected mobile network operator 316 using the private network incurring the least cost. In another example, each private network may have a coverage area. In this case, the authentication broker 314 may transmit the authorization request to the selected mobile network using the private network with the highest coverage area. Other metrics may be used for determining which private networks to transmit the authorization request.

The mobile network operator 316 generates 334 an authentication vector for the client device 310 based on the identifying information included in the authorization request. The authentication vector is configured to verify the client device 310. That is, the authentication verifies that the client device 310 transmitting the authorization request, is the client device 310 corresponding to the user profile to which the client device 310 is requesting access on the online system. For example, the authentication request may include an IMSI for the client device 310 requesting to access the user profile. The authentication vector is configured to verify that the IMSI received as part of the authentication request is the same as the IMSI associated with the user account on the online system.

In an example configuration, the authentication vector includes three parameters: (i) a random number network challenge (RAND), a cipher key (KC), and an expected user response (XRES). The RAND may be used in authentication and verification functions; the CK corresponds to the client device 310 such that the authentication broker 314 may decrypt transmissions received from the client device 310 using the CK; and the XRES is an expected response from the client device 310 when responding to a verification challenge. In other configurations the authentication vector may include other numbers of parameters and the parameters may be different. The mobile network operator 316 transmits 336 the authentication vector to the authentication broker 314 via the private network.

The authentication broker 314 generates 338 a verification challenge for the client device 310 using the authentication vector. The verification challenge verifies that the client device 310 receiving the challenge is the client device 310 corresponding to the authentication vector (and thereby the user profile to which the client device 310 is requesting access on the online system). In an example, the verification challenge is an extensible authentication protocol subscriber identity module (EAP-SIM) verification challenge. In this example, the verification challenge is a vector including two parameters: (i) a MAC, and (ii) a random number network challenge (RAND). The MAC may be used to authenticate and verify the client device 310; and the RAND may be used in authentication and verification functions. In other configurations the verification challenge may include other numbers of parameters and the parameters may be different.

The authentication broker 314 transmits the verification challenge to the client device 310 via the local-area network. In one example, the authentication broker 314 transmits 340 the verification challenge to a network access point 312 for the local-area network. In response to receiving the verification challenge, the network access point 312 relays 342 the verification challenge and transmits 344 the verification challenge to the client device 310.

The client device 310 generates 346 a verification response to the verification challenge. In an example, the verification response is a vector including a single parameter: (i) a signed response (SRES). In this case, to generate the verification response, the client device 310 verifies that the received MAC is the MAC stored on the client device 310. If the MACs are the same, the client device 310 generates the SRES for the verification response. In some configurations, the client device 310 may encrypt the verification response. In this case, the client device 310 may generate a cipher key (CK) corresponding to the MAC and encrypt the SRES using the CK. Other examples of keyed encryption are also possible. Similarly, in other configurations the verification challenge may include other numbers of parameters and the parameters may be different.

The client device 310 transmits 348 the verification response to the network access point 312 for the local-area network. After receiving the verification response, the network access point 312 relays 350 the verification response and transmits 352 the verification response to the authentication broker 314.

The authentication broker 314 verifies 354 the client device 310 using the verification response and the authentication vector. Generally, the authentication broker 314 verifies the client device 310 if information included in the verification response corresponds to information in the authentication vector. To illustrate, for example, the authentication vector may include a KC and an XRES corresponding to the client device 310, and the verification response may include an SRES encrypted with a CK corresponding to the client device 310. In this case, the authentication broker 314 decrypts the SRES with the KC because both the CK and KC correspond to the client device 310. The authentication broker 314 verifies 354 the client device 310 if the decrypted SRES matches the XRES. A verified client device 310 may access the online system via the local network. Other verification processes are also possible.

The authentication broker 314 generates an authentication notification. The authentication notification indicates that the client device 310 may access the functionality of the online system (e.g., an indicator on a display of the client device 310). In some cases, the authentication notification may enable some functionality of the online system that was previously disabled. For example, the authentication notification may allow the client device 310 to access the online system. The authentication broker 314 transmits 356 the authentication notification to a network access point 312 for the local network. In response to receiving the authentication notification, the network access point 312 relays 358 the authentication notification and transmits 360 the authentication notification to the client device 310.

After the client device 310 is verified, the authentication broker fetches 362 identification information for the verified client device 310 from the mobile network operator 316. For example, the authentication broker 314 may transmit a request for the identification information to the mobile network operator 316 via the private network and the mobile network operator 316 may transmit the identification information to the authentication broker 314 via the private network in response. As an example, the identification information may be information necessary for a Know Your Customer ("KYC") protocol. To illustrate, the authentication broker may receive a mobile station international subscriber director number ("MSISDN") for the client device 310. The authentication broker 314 may then transmit the MSISDN to the online system such that the user of the client device is allowed to access the user profile on the online system. In other words, the authentication broker 314 transmits an authentication to online system that the client device 310 is allowed to access the user profile. In a particular configuration, the authentication broker 314 employs RFC 4186 to fetch information. RFC 4186 is a standard describing how IMSI and authentication vectors can be exchanged between a client device 310 with 2G SIM and the network access point 312. In another particular configuration, the authentication broker employs RFC 4187 to fetch information. 4187 relates to a similar procedure but is for 3G and 4G SIM rather than 2G.

Once the client device 310 has been verified, the client device 310 is able to access the online system. For example, the client device 310 requests 368 data from the online system and transmits 370 the request to the network access point 312. The network access point 312 relays the data request to the online system such that the online system may access 372 the requested data. The online system may query the authentication broker 314 to confirm that the requesting client device has been verified as part of a KYC protocol, and the authentication broker may provide a confirmation in response. For example, the online system may request the MSISDN information and the authentication broker provides the MSISDN information in response. Once accessed, the online system transmits the requested data to the network access point 312 and the network access point 312 relays the requested data and transmits 374 the requested data to the client device 310. The client device 310 displays 376 the requested data.

In some embodiments, a user of the client device 310 may select to employ the authentication method 300 to access the user profile of the online system on a user interface of the client device 310. In particular, the user of the client device 310 may select to employ the authentication method 300 when the client device is able to access the private network. Further the user may employ the authentication method 300 to access various user profiles, network systems, etc. that may be employed in a system environment.

Embodiments of the proposed authentication method may be used to e.g., provide authentication in areas where there is no cellular coverage. For example, a satellite service provider may want to deploy a satellite modem in an area which has no cellular coverage. The proposed solution allows for authentication of the client device via the satellite modem while adhering to Know Your Customer protocols of the online system. Moreover, the proposed solution may be used for general authentication of a client device for an online system. For example, mobile apps usually leverage one true pair ("OTP") via SMS or social network plugins for authentication. However, apps could use proposed system environments and methodologies for seamless authentication. In this case, a software development kit may be implemented to extract identification information from a client device and securely transmit identification information to an authentication broker for authentication.

Example Authentication

Figure 4:
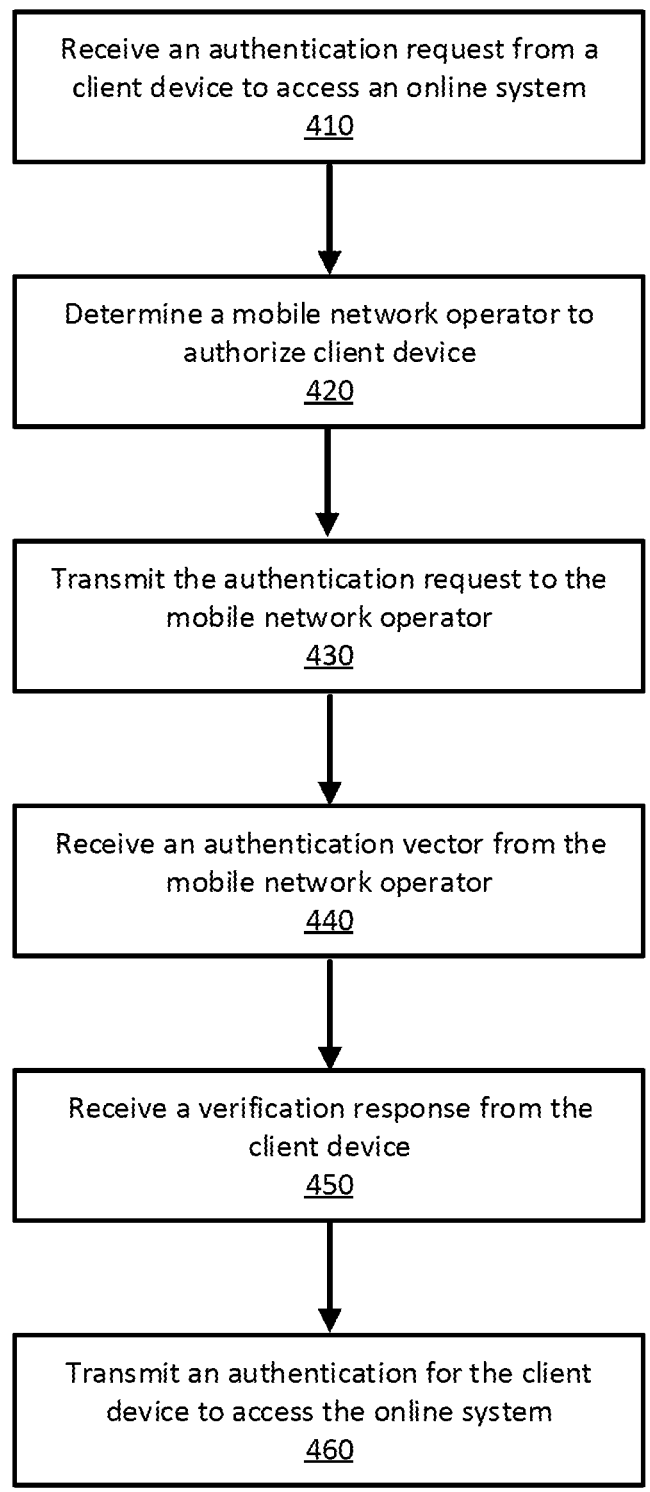
FIG. 4 is a flow diagram illustrating a method for authenticating a client device using a local-area network, according to one or more embodiments.

FIG. 4 is a flow diagram illustrating a method 400 for authenticating a client device using a local-area network. The method 400 may occur on an authentication broker (e.g., authentication broker 152). The method 400 allows a client device (e.g., client device 110) to access a user profiler of an online system (e.g., online system 140) using identification information of the client device. The authentication broker is configured to communicate with a number of authentication systems (e.g., authentication system 150) via a private network (e.g., private network 124). The method 400 can include additional or fewer steps, the steps may occur in any order, and any of the steps may be repeated. Further, the steps of the method 400 may be combined, and/or the steps may be performed on other platforms.

The authentication broker receives 410 an authentication request from a client device to access an online system. In particular, the client device may request authorization for a user of the client device to access their corresponding user profile on the online system. The authentication request may include identification information for the client device. Further, the authentication request may be received via a public network or, more specifically, received from the client device using a public network. Here, the public network includes a wide-area network (e.g., the internet) connecting a network access point and the online system, and a local-area network (e.g., a Wi-Fi network) connecting the client device to then network access point.

The authentication broker determines 420 a mobile network operator of a plurality of mobile network operators to authenticate the client device. For example, the authentication broker may determine a mobile network operator to authenticate the client device based on the identification information included in the authentication request. For example, if the identification information includes an IMSI indicating a mobile network operator, the authentication broker selects the indicated mobile network operator to authenticate the client device.

The authentication broker transmits 430 the authentication request to the determined mobile network operator via a private network. In an example, the private network is a network employing an IPX protocol. As such, the authentication broker transmits the authentication request to the mobile network operator using the IPX network.

The authentication broker receives 440 an authentication vector from mobile network operator via the private network. The authentication vector is configured to verify that the client device is authorized to access the online system. In particular, the authentication vector is configured to verify that the client device is authorized the user profile on the online system for which it is requesting access. To do so, the authentication vector identifies that the client device includes the identification information received with the authentication request. The authentication broker generates a verification challenge for the client device corresponding to the authentication vector and transmits the verification challenge to the client device via the public network.

The authentication broker receives 450 a verification response. The client device generates the verification response to the verification challenge and transmits the verification response to the authentication broker via the public network. The verification response includes information identifying that the client device includes identification infuriation the authorization request.

The authentication broker transmits 460 an authentication for the client device to access the online system to the client device via the public network. The authentication transmits the authentication in response to the authentication broker authenticating the client device. The authentication broker authenticates the client device by comparing the authentication vector and the verification response. In particular, if the information included in both the authentication vector and the verification response indicates that the client device includes the identification information included in the authorization request, the authentication broker authenticates the client device.

Example Computer System

Figure 5:
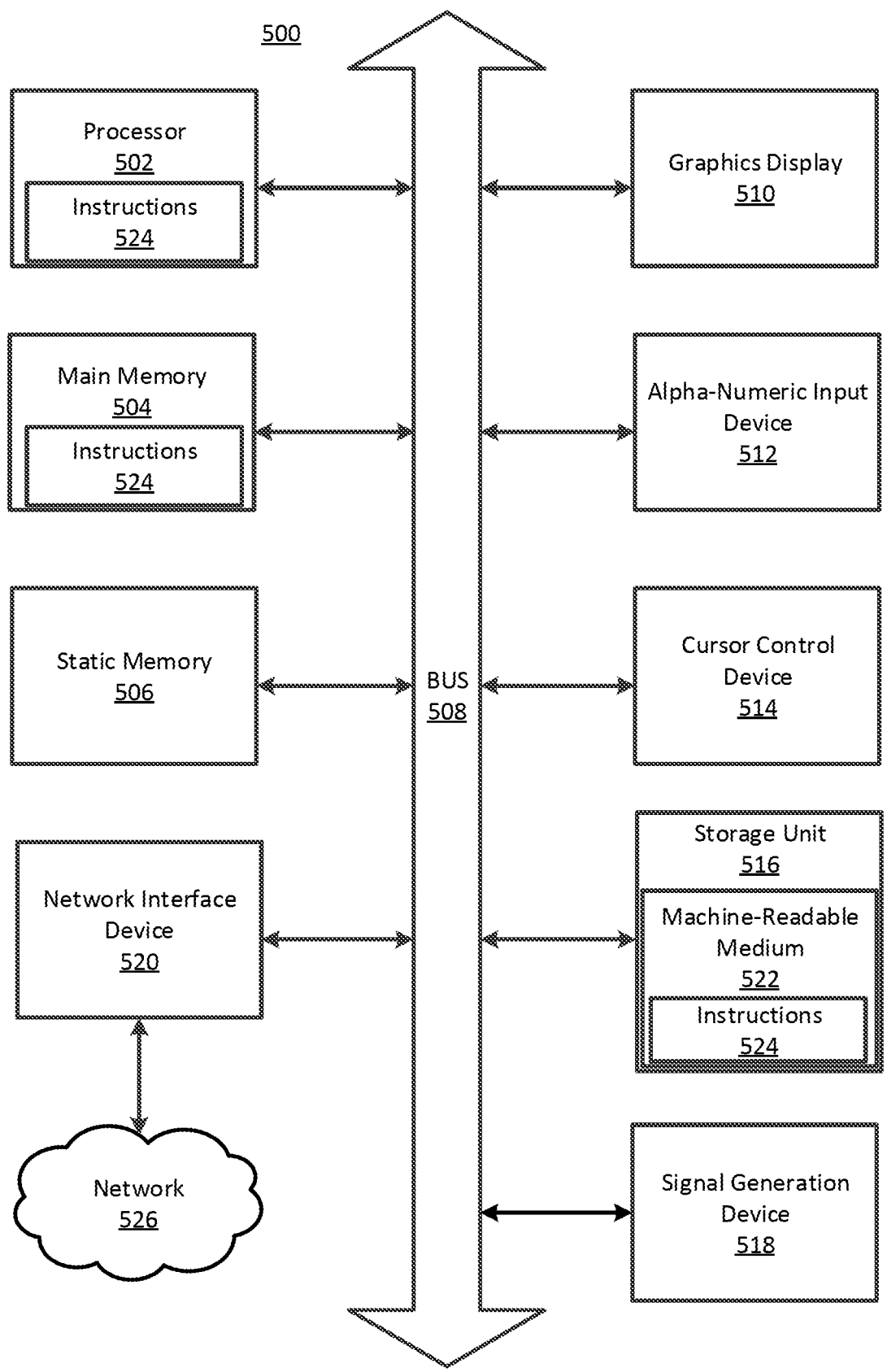
FIG. 5 illustrates a block diagram of a computer system, according to one or more embodiments.

FIG. 5 is a block diagram illustrating components of an example machine for reading and executing instructions from a machine-readable medium. Specifically, FIG. 1B shows a diagrammatic representation of device 110, network access point 122, third-party system 130, online system 140, authentication system 150, and authentication broker 152 in the example form of a computer system 500. The computer system 500 can be used to execute instructions 524 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a system environment (e.g., system environment 100B), or as a peer machine in a peer-to-peer (or distributed) system environment.

The machine may be a server computer, a client computer, a personal computer (PC), a tablet PC, a set-top box (STB), a smartphone, an internet of things (IoT) appliance, a network router, switch or bridge, or any machine configured to execute instructions 524 (sequential or otherwise) that specify actions to be taken by that machine. Further, while only a single machine is illustrated, the term "machine" shall also be taken to include any collection of machines that individually or jointly execute instructions 524 to perform any one or more of the methodologies discussed herein.

The example computer system 500 includes one or more processing units (generally processor 502). The processor 502 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 500 also includes a main memory 504. The computer system may include a storage unit 516. The processor 502, memory 504, and the storage unit 516 communicate via a bus 508.

In addition, the computer system 500 can include a static memory 506, a graphics display 510 (e.g., to drive a plasma display panel (PDP), a liquid crystal display (LCD), or a projector). The computer system 500 may also include alphanumeric input device 512 (e.g., a keyboard), a cursor control device 514 (e.g., a mouse, a trackball, a joystick, a motion sensor, or other pointing instrument), a signal generation device 518 (e.g., a speaker), and a network interface device 520, which also are configured to communicate via the bus 508.

The storage unit 516 includes a machine-readable medium 522 on which is stored instructions 524 (e.g., software) embodying any one or more of the methodologies or functions described herein. For example, the instructions 524 may include the functionalities the systems described in FIG. 1B. The instructions 524 may also reside, completely or at least partially, within the main memory 504 or within the processor 502 (e.g., within a processor's cache memory) during execution thereof by the computer system 500, the main memory 504 and the processor 502 also constituting machine-readable media. The instructions 524 may be transmitted or received over a network 526 (e.g., local-area network 120, wide-area network 126, and private network 124) via the network interface device 520.

While machine-readable medium 522 is shown in an example embodiment to be a single medium, the term "machine-readable medium" should be taken to include a single medium or multiple media (e.g., a centralized or distributed database, or associated caches and servers) able to store the instructions 524. The term "machine-readable medium" shall also be taken to include any medium that is configured to store instructions 524 for execution by the machine and that cause the machine to perform any one or more of the methodologies disclosed herein. The term "machine-readable medium" includes, but not be limited to, data repositories in the form of solid-state memories, optical media, and magnetic media.

Conclusion

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   receiving, from a client device via a public network, an authentication request for the client device to access an online system, the authentication request comprising identification information for the client device;
   determining a mobile network operator of a plurality of mobile network operators to authenticate the client device, the plurality of mobile network operators using an internetwork packet exchange protocol (IPX) to exchange information;
   transmitting the identification information to the mobile network operator via a private network executing the IPX protocol and associated with the determined mobile network operator;
   receiving, from the mobile network operator via the private network, an authentication vector, the authentication vector for identifying the client device having the identification information;
   receiving, from the client device via the public network, a verification indicating that the client device has the identification information included in the authentication vector; and
   in response to the verification that the client system has the identification information, transmitting, to the client device via the public network, an authentication for the client device to access the online system.

2. The method of claim 1, wherein receiving the authentication request for the client device further comprises:
   receiving, from a network access point connected to the client device via a local-area wireless network, the authentication request for the client device to access the online system.

3. The method of claim 1, receiving the verification further comprises:
   transmitting, to a network access point connected to the client device via a local-area wireless network, the verification request; and
   receiving, from the access point connected to the client device via the local-area wireless network, the verification that the client system has the identification information.

4. The method of claim 1, wherein receiving the verification further comprises:
   generating a verification challenge, the verification challenge configured to verify the client device has the identification information, the verification challenge generated using the authentication vector received from the mobile network operator.

5. The method of claim 1, wherein receiving the authentication request is in response to the client device determining a connectivity to the private network and the public network.

6. The method of claim 1, wherein determining the mobile network operator is based on a cost of transmitting the authorization request to the mobile network operator via the private network.

7. The method of claim 1, wherein determining the mobile network operator further comprises:
   accessing an identifier for the client device from the identification information;

accessing a network code associated with the identifier, the network code indicating a particular mobile network operator of the plurality of mobile network operators; and determining the mobile network operator is the particular mobile network operator associated with the network code.

8. The method of claim 1, wherein determining the mobile network operator further comprises:

accessing an identifier associated with a user profile for the client device on the online system, the user profile indicating a particular mobile network operator of the plurality of mobile network operators; and determining the mobile network operator is the particular network operator indicated by the user profile.

9. The method of claim 1, wherein determining the mobile network operator further comprises:

determining, for each mobile network operator of the plurality of mobile network operators, a connectivity of the client device the mobile network operator; and determining the mobile network operator based on the connectivities.

10. The method of claim 1, wherein the identification information at least comprises information stored on a Subscriber Information Module (SIM) Card of the client device.

11. The method of claim 1, wherein the client system cannot connect to the mobile network operator via the private network.

12. The method of claim 1, wherein the private network operates using the internetwork packet exchange (IPX) protocol for communicating with the plurality of mobile network operators.

13. The method of claim 1, wherein the mobile network operator is a mobile carrier and the private network is a mobile carrier network (MCN).

14. A computer program product comprising a non-transitory computer readable storage medium containing computer program code for:

receiving, from a client device via a public network, an authentication request for the client device to access an online system, the authentication request comprising identification information for the client device;

determining a mobile network operator of a plurality of mobile network operators to authenticate the client device, the plurality of mobile network operators using an internetwork packet exchange protocol (IPX) to exchange information;

transmitting the identification information to the mobile network operator via a private network executing the IPX protocol and associated with the determined mobile network operator;

receiving, from the mobile network operator via the private network, an authentication vector, the authentication vector for identifying the client device having the identification information;

receiving, from the client device via the public network, a verification indicating that the client device has the identification information included in the authentication vector; and in response to the verification that the client system has the identification information, transmitting, to the client device via the public network, an authentication for the client device to access the online system.

15. The computer program product of claim 14, wherein receiving the authentication request for the client device further comprises:

receiving, from a network access point connected to the client device via a local-area wireless network, the authentication request for the client device to access the online system.

16. The computer program product of claim 14, receiving the verification further comprises: transmitting, to a network access point connected to the client device via a local-area wireless network, the verification request; and receiving, from the access point connected to the client device via the local-area wireless network, the verification that the client system has the identification information.

17. The computer program product of claim 14, wherein determining the mobile network operator further comprises: accessing an identifier for the client device from the identification information; accessing a network code associated with the identifier, the network code indicating a particular mobile network operator of the plurality of mobile network operators: and determining the mobile network operator is the particular mobile network operator associated with the network code.

18. The computer program product of claim 14, wherein determining the mobile network operator further comprises: accessing an identifier associated with a user profile for the client device on the online system, the user profile indicating a particular mobile network operator of the plurality of mobile network operators: and determining the mobile network operator is the particular network operator indicated by the user profile.

19. The computer program product of claim 15, wherein determining the mobile network operator further comprises:

determining, for each mobile network operator of the plurality of mobile network operators, a connectivity of the client device to the mobile network operator; and determining the mobile network operator based on the connectivities.

20. A system comprising:

one or more processors;

a datastore comprising a non-transitory computer-readable storage medium computer program code that, when executed by the one or more processors, cause the processors to execute a method for:

receiving, from a client device via a public network, an authentication request for the client device to access an online system, the authentication request comprising identification information for the client device;

determining a mobile network operator of a plurality of mobile network operators to authenticate the client device, the plurality of mobile network operators using an internetwork packet exchange protocol (IPX) to exchange information;

transmitting the identification information to the mobile network operator via a private network executing the IPX protocol and associated with the determined mobile network operator;

receiving, from the mobile network operator via the private network, an authentication vector, the authentication vector for identifying the client device having the identification information;

receiving, from the client device via the public network, a verification indicating that the client device has the identification information included in the authentication vector; and in response to the verification that the client system has the identification information, transmitting, to the client device via the public network, an authentication for the client device to access the online system.

\* \* \* \* \*